United States Patent
Scarlett

(10) Patent No.: US 6,962,382 B2
(45) Date of Patent: Nov. 8, 2005

(54) BARRIER SYSTEM

(76) Inventor: David Scarlett, 23470 Norwood, Oak Park, MI (US) 48237

( * ) Notice: Subject to any disclaimer, the term of this patent is extended or adjusted under 35 U.S.C. 154(b) by 0 days.

(21) Appl. No.: 10/852,539

(22) Filed: May 24, 2004

(65) Prior Publication Data

US 2004/0232719 A1  Nov. 25, 2004

Related U.S. Application Data

(60) Provisional application No. 60/472,931, filed on May 23, 2003.

(51) Int. Cl.$^7$ ............................................. B60R 27/00
(52) U.S. Cl. ................................ 296/24.46; 296/24.42; 296/24.43
(58) Field of Search .......................... 296/24.46, 24.4, 296/68.1, 63, 37.8, 37.1, 37.15, 66, 24.34, 296/24.42, 24.43, 190.11, 24.41, 180.1; 280/727, 749, 728.2, 730.1, 730.2; 248/503.1, 248/311.2; 297/464

(56) References Cited

U.S. PATENT DOCUMENTS

| | | | | |
|---|---|---|---|---|
| 2,865,670 A | * | 12/1958 | Dunn | 296/24.42 |
| 2,884,279 A | * | 4/1959 | Halstead et al. | 296/24.42 |
| 3,015,515 A | * | 1/1962 | Halstead et al. | 296/24.42 |
| 3,190,686 A | * | 6/1965 | Smiler | 296/24.46 |
| 3,190,687 A | * | 6/1965 | Johnson | 296/24.46 |
| 3,214,211 A | * | 10/1965 | Setina | 296/24.46 |
| 3,397,005 A | * | 8/1968 | May et al. | 296/24.46 |
| 3,441,309 A | * | 4/1969 | Halstead et al. | 296/24.46 |
| 3,525,535 A | * | 8/1970 | Kobori | 280/749 |
| 4,015,875 A | * | 4/1977 | Setina | 296/24.46 |
| 4,035,014 A | * | 7/1977 | Sellers | 296/24.46 |
| 4,173,369 A | * | 11/1979 | Roggin | 296/24.46 |
| 4,595,227 A | * | 6/1986 | Setina | 296/24.46 |
| 4,964,666 A | * | 10/1990 | Dillon | 296/24.46 |
| 5,123,707 A | * | 6/1992 | Wurzell | 297/464 |
| 5,246,261 A | * | 9/1993 | McCormack | 296/24.34 |
| 5,511,842 A | * | 4/1996 | Dillon | 296/24.42 |
| 5,516,016 A | * | 5/1996 | Anderson et al. | 248/311.2 |
| 5,536,057 A | * | 7/1996 | Stewart | 296/24.46 |
| 5,551,726 A | * | 9/1996 | Ament | 296/24.43 |
| 5,632,520 A | * | 5/1997 | Butz | 296/24.43 |
| 5,695,217 A | * | 12/1997 | Ament et al. | 280/749 |
| 5,848,817 A | * | 12/1998 | Niehaus | 296/24.46 |
| 5,971,487 A | * | 10/1999 | Passehl | 296/24.46 |
| 6,059,313 A | * | 5/2000 | Coogan et al. | 296/24.43 |
| 6,183,028 B1 | * | 2/2001 | Ament et al. | 296/24.43 |
| 6,250,700 B1 | * | 6/2001 | Traxler | 296/24.46 |
| 6,260,903 B1 | * | 7/2001 | von der Heyde | 296/24.96 |
| 6,260,916 B1 | * | 7/2001 | Hunt | 296/190.11 |
| 6,279,639 B1 | * | 8/2001 | Schlecht et al. | 160/23.1 |
| 6,286,882 B1 | * | 9/2001 | Rastetter | 296/24.41 |

(Continued)

*Primary Examiner*—Kiran B. Patel
(74) *Attorney, Agent, or Firm*—Gifford, Krass, Groh, Sprinkle, Anderson & Citkowski, P.C.

(57) ABSTRACT

A barrier system for deterring movement of people, pets and things from the rear of a vehicle into the forward seats of a vehicle includes a body. A plurality of mounting brackets are secured to the body and engaged by mounting members or straps. A back wall of the body may be constructed of a heavy-duty fabric and may also include a pocket or cup holder. In operation, the body is positioned in the passenger compartment in the space between two seats (e.g., the front driver and passenger seats or, in a large vehicle, between second row rear passenger seats). The mounting members are used to support the body in position. Once in position, the body deters the forward movement of persons, pets and things from the rear seats and into, for example, the driver's seat.

20 Claims, 2 Drawing Sheets

U.S. PATENT DOCUMENTS

| | | | |
|---|---|---|---|
| 6,390,526 B1 * | 5/2002 | Ament et al. | 296/24.43 |
| 6,402,227 B1 * | 6/2002 | Riehle et al. | 296/180.1 |
| 6,416,104 B1 * | 7/2002 | Fisher et al. | 296/190.11 |
| 6,513,863 B1 * | 2/2003 | Renke et al. | 296/190.11 |
| 6,595,567 B1 * | 7/2003 | Ament et al. | 296/24.43 |
| 6,598,921 B2 * | 7/2003 | Seel et al. | 296/24.43 |
| 6,692,063 B2 * | 2/2004 | Dreher et al. | 296/180.1 |
| 6,827,382 B2 * | 12/2004 | Murray et al. | 296/24.46 |
| 6,837,529 B2 * | 1/2005 | Kharod et al. | 296/24.4 |
| 6,871,894 B2 * | 3/2005 | Zummack | 296/24.43 |

* cited by examiner

BARRIER SYSTEM

RELATED APPLICATION

This application claims priority of U.S. Provisional Patent Application Ser. No. 60/472,931 filed May 23, 2003, which is incorporated herein by reference.

BACKGROUND OF THE INVENTION

1. Field of the Invention

The present invention is directed to a barrier for deterring movement between passenger spaces in a vehicle. More specifically, the invention concerns a panel that is removably secured in open spaces between seats to discourage movement of people, pets and things between sections of a vehicle.

2. Reference to Related Art

It is quite often far too easy for children and pets to quickly move forward from the cargo area or rear seats of a vehicle and into, for example, the front seats. This ease of movement is generally unwanted and may also create a safety hazard to the child or pet or even the operator of the vehicle. Accordingly, various devices have been developed that prohibit the passage of persons and pets from the rear of the vehicle into the front of the vehicle.

For example, a variety of vehicle dog barriers are presently available that are designed to prohibit movement of a dog from the rear of the vehicle forward toward the driver. A typical example of such a barrier is the 4-Bar Steel Barrier manufactured by Meblo. The Meblo barrier is intended to be used for SUVs and wagons and features an adjustable tubular construction. The barrier is installed in the cargo area of the vehicle immediately behind the rear seats such that a dog sitting in the cargo area is confined (jailed) into that area.

As an alternative to a rigid barrier, an individual may also extend a mesh net behind the front seat (or in the cargo area, etc.) as a means of prohibiting the forward movement of a child or pet in a vehicle. One such net is sold under the name Pet Net Car Barrier. The Pet Net barrier is stretched across the back of the car and secured in position by dual lock reclosable fasteners.

While these prior art devices are effective at completely prohibiting the passage of most any object, they may also impair a driver's view into the rear of the vehicle and also block the driver's view of any traffic that might otherwise be visible through the rearview mirror. Therefore, it would be advantageous to have a device that would deter passage of persons and things between seating sections of a vehicle while not limiting or otherwise impairing the driver's control of the vehicle.

SUMMARY OF THE INVENTION

The barrier system includes a body having a first pair and a second pair of mounting brackets. A first and a second pair of mounting members are removably affixed to the brackets (e.g., a D-ring) and secure the body of the barrier system in position between seats positioned in the passenger compartment of a vehicle.

The body includes a front and a back wall, sidewalls, a top wall and a bottom wall. The back wall may be constructed of a heavy-duty fabric that is tear and/or abrasion resistant material (e.g., ballistic nylon, KEVLAR® or SPECTRA®).

The bottom wall has a length that is shorter than the length of the top wall so that the body has a generally wedge or parallelogram shape. However, it will be appreciated that the body may be constructed in different shapes (i.e., square, rectangle, etc.) and dimensions in accordance with the needs of a user.

The walls of the body define an open interior. A zipper is provided along the bottom wall to provide access into the open interior. The body is internally supported and given an overall padded feel by the use of a pair of foam panels that are positioned in the open interior. A rigid board is disposed between the panels to provide additional structural support to the body.

The first pair of mounting members each includes a pair of fasteners that are disposed on opposite ends of an elastic band. One fastener on each of the first pair of mounting members is removably secured to one bracket of the first pair of brackets. The other fastener on each of the first pair of mounting members (which is located on the opposite end of the band) is removably securable to a portion of a vehicle interior (e.g., a post for a headrest of a seat).

The second pair of mounting members also each includes a pair of fasteners that are connected together by a fabric band. One fastener on each of the second pair of mounting members is removably secured to one bracket of the first pair of brackets. The other fastener on each of the second pair of mounting members is securable to the vehicle interior.

A clip (e.g., a J-clip) is securable to the bottom surface of the body and is capable of engaging the hinge position of the center console of the vehicle. As such, the body may be supported in position on the console between the seats with or without the use of the mounting members. A pocket or cup holder or other similar accessory may also be disposed on the back wall of the body.

In operation, the body is positioned in the passenger compartment in a space between two seats. The mounting members and/or the clip are used to support the body in position. Once in position the barrier system deters the forward movement of persons, pets and things from the rear seats and into, for example, the driver's seat.

BRIEF DESCRIPTION OF THE DRAWINGS

A better understanding of the present invention will be had upon reference to the attached drawings wherein like reference numerals refer to like parts throughout and wherein:

FIG. 3 is a perspective rear view of a barrier system operable to engage a console; and FIG. 4 is a partial side cutaway view of the barrier system showing the body in engagement with a vehicle console.

DETAILED DESCRIPTION OF THE INVENTION

Figure 1:
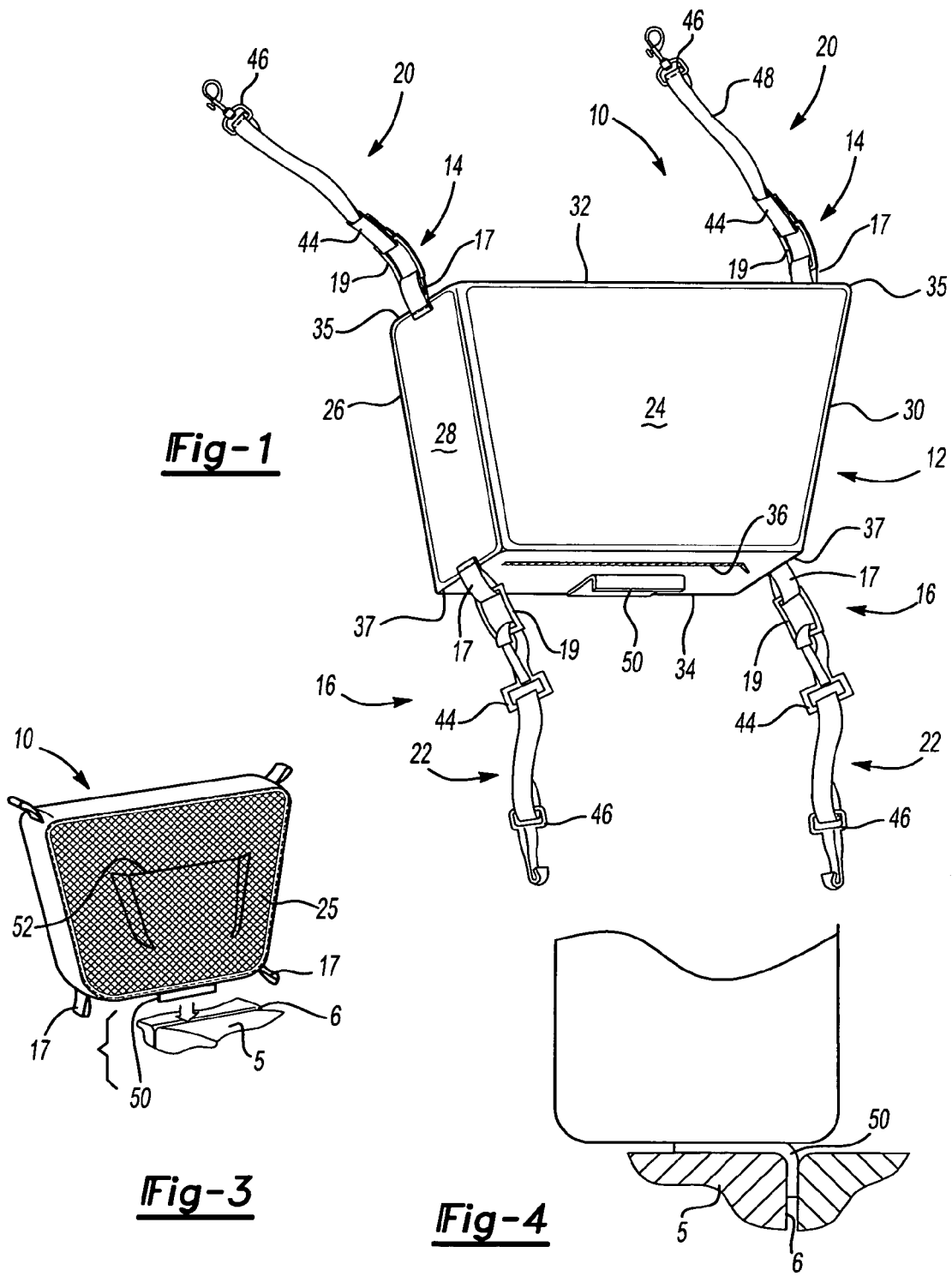
FIG. 1 is a perspective view of a barrier system constructed in accordance with the present invention.
Figure 2:
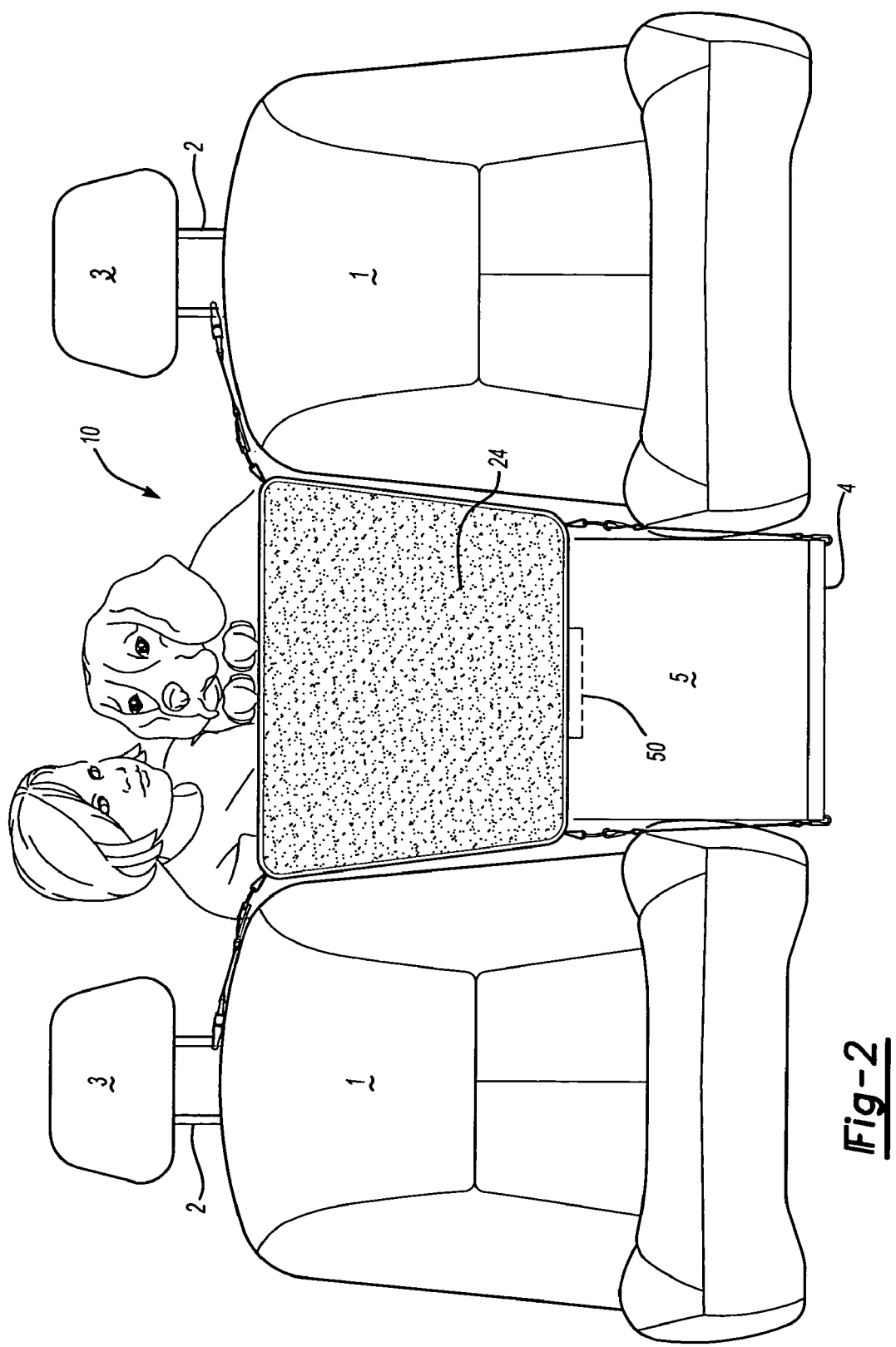
FIG. 2 is a perspective environmental view a barrier system in position between two seats.

Referring now to FIGS. 1 and 2, the barrier system 10 of the present invention includes a body 12 having a first pair 14 and a second pair 16 of mounting brackets. A first and a second pair of mounting members 20, 22 are removably affixed to the brackets 14, 16 (e.g., a D-ring) and secure the body 12 of the barrier system 10 in position between seats 1 positioned in the passenger compartment of a vehicle (not shown).

Referring now to FIGS. 1–3, the body 12 of the barrier system 10 includes a front and a back wall 24, 26; sidewalls 28, 30; a top wall 32 and a bottom wall 34. The walls 24, 26, 28, 30, 32, 34 of the body 12 are constructed using vehicle interior fabrics and/or material (e.g., vinyl, leather, plastic, textiles, etc.) and may be coated or manufactured to be waterproof or water resistant. The back wall 26 (i.e., the surface that would normally face a child or a pet positioned in a back seat (not shown)) is preferably constructed of a heavy-duty fabric that is tear and/or abrasion resistant 25. Suitable heavy-duty fabrics include ballistic nylon, KEVLAR® brand fabric (DuPont) and Spectra® brand fabrics (Honeywell).

As seen in FIGS. 1 and 2, the first pair of mounting brackets 14 are positioned at the ends 35 of the top wall 32 of the body 12. Likewise, the second pair of mounting brackets are positioned at the ends 37 of the bottom wall 34 of the body 12. The mounting brackets 14, 16 are constructed as loops of fabric 17 secured around metal D-rings 19. However, the brackets 14, 16 may also be constructed from the same material as the body 12, or from an abrasion-resistant material or some other material, or as some other metal brackets that are secured to the ends 35, 37 of the top 32 and bottom 34 walls.

Referring to FIGS. 1–3, the bottom wall 34 has a length that is shorter than the length of the top wall 32 so that the body 12 has a generally wedge or parallelogram shape. In a particularly preferred embodiment, the bottom wall 34 has a length of 8 inches with the sidewalls 28, 30 and the top wall 32 each having a length of 12.5 inches. However, it will be appreciated that the body 12 may be constructed in different shapes (i.e., square, rectangle, etc.) and dimensions in accordance with the needs of a user.

Still referring to FIGS. 1–3, the walls 24, 26, 28, 30, 32, 34 of the body 12 define an open interior (not shown). A zipper 36 is provided along the bottom wall 34 to provide access to the open interior (not shown). The body 12 is internally supported and given an overall padded feel by the use of a pair of foam panels (not shown) that are positioned in the open interior (not shown). A rigid board (not shown) is disposed between the panels to provide additional structural support to the body 12. The rigid board used may be a foam board product that is sold commercially under the name STURDY BOARD®. However, it will be appreciated that other materials (e.g., a rigid foam, corrugated or fibrous board) may also be used. Alternatively, the body 12 may be supported by an internal frame (not shown) constructed of, for example, steel, carbon fiber or plastic.

Still referring to FIGS. 1–2, the first pair of mounting members 20 each includes a pair of fasteners 44, 46 that are disposed on opposite ends of a band 48 that may be a fabric or an elastic band (e.g., a cord, rope or a metal or plastic ribbon may also be used). One fastener 44 on each of the first pair of mounting members 20 is removably secured to the one bracket of the first pair of brackets 14. The other fastener 46 on each of the first pair of mounting members 20 is removably securable to a portion of a vehicle interior, such a post 2 for a headrest 3 of a seat 1. As shown in FIG. 1, the fasteners 44 secured to the mounting members 20 include a closable clip and the fasteners 46 secured to the vehicle interior include a hook. However, it will be appreciated that a host of different fasteners (e.g., hooks, clips, pins, etc.) may be used in connection with the barrier system 10.

Referring to FIGS. 1 and 2, the second pair of mounting members 22 also each includes a pair of fasteners 44, 46 that are connected together by a band 48 that may be a fabric or an elastic band (e.g., a cord, rope or a metal or plastic ribbon may also be used). One fastener 44 on each of the second pair of mounting members 22 is removably secured to one bracket of the first pair of brackets 16. The other fastener 46 on each of the second pair of mounting members 22 is securable to the vehicle interior. For example, as best shown in FIG. 2, the barrier system 10 is preferably removably secured to a base 4 of a center console 5 that is disposed between the seats 1 of the vehicle. As set forth above, it will be again appreciated that the fasteners 44, 46 that are securable to the second pair of mounting members 22 may also include a variety of fasteners, all of which are effective at securing the mounting members 22 (and 20) to the brackets 16 (and 14) and to the various portions of the vehicle.

Referring to FIGS. 1–4, additionally or alternatively, a clip 50 (e.g., a J-clip) is securable to the bottom surface 34 of the body 12 and is capable of engaging the hinge position 6 of the center console 5 of the vehicle. As such, the body 12 may be supported in position on the console 5 between the seats 1 with or without the use of the mounting members 20, 22. As best shown in FIG. 3, a holding accessory 52 such as pocket or a cup holder or other similar accessory may also be disposed or incorporated into the back wall 26 of the body 12.

Referring now to FIG. 2, in operation, the body 12 of the barrier system 10 is positioned in the passenger compartment of a vehicle in the space between the two seats 1 (e.g., the front driver and passenger seats or, in a large vehicle, between second row rear passenger seats). The mounting members 20, 22 and/or the clip 50 are used to support the body 12 in position. Once in position the barrier system 10 deters the forward movement of persons, pets and things from the rear seats and into, for example, the driver's seat.

The inventor has found the barrier system 10 has particular application in a Mercury Mountaineer; however, it will be appreciated that modifications to the shape of the body 12 or the length of the mounting members 20, 22 would permit the system 10 to be used in a wide variety of vehicles.

Having thus discussed the invention, various modifications will become known to those having skill in the art that do not depart from the scope of the invention.

What is claimed is:

1. A barrier system for deterring movement of people, pets and things from a rear of a vehicle into a forward section of a vehicle, comprising in combination:

a vehicle having a passenger compartment, the passenger compartment including a pair of spaced apart front seats and a pair of rear seats and a center console disposed between the pair of front seats; and a barrier operable to be positioned between front seats, the barrier including a body and a first and a second pair of mounting members, the first pair of mounting members each including a band having a first fastener at a first end and a second fastener at an opposite end, the first fastener being removably secured to the body and the second fastener being operable to be removably secured to one of the front seats, the second pair of mounting members each including a band having a first fastener at a first end and a second fastener at an opposite end, the first fastener of the second mounting members being removably secured to the body and the second fastener of the second mounting members being operable to be removably secured to the console.

2. The barrier system of claim 1, wherein each band of the first mounting members is an elastic band.

3. The barrier system of claim 1, wherein each band of the second mounting members is a fabric band.

4. The barrier system of claim 1, wherein the body comprises a front wall, a back wall, a pair of sidewalls, a top wall and a bottom wall, the top and bottom wall each having a pair of ends.

5. The barrier system of claim 4, further comprising a clip secured to the bottom wall, the clip being operable to engage the center console such that the body is supported on the console between the front seats.

6. The barrier system of claim 4, further comprising a first and a second pair of mounting brackets, each mounting bracket of the first pair being positioned at each end of said top wall and each mounting bracket of the second pair being positioned at each end of the bottom wall.

7. The barrier system of claim 4, wherein the back wall comprises a heavy-duty fabric.

8. The barrier system of claim 7, wherein the heavy-duty fabric is ballistic nylon.

9. The barrier system of claim 4, wherein the back wall comprises a holding accessory.

10. The barrier system of claim 1, wherein the body comprises vehicle interior fabrics or materials.

11. The barrier system of claim 4, wherein the bottom wall has a length that is shorter than a length of the top wall.

12. The barrier system of claim 7, wherein the bottom wall comprising a fastener.

13. A barrier system for deterring movement of people, pets and things from the rear of a vehicle into the front seats of a vehicle, comprising:
  a body having a front wall, a back wall, a pair of sidewalls, a top wall and a bottom wall, the top and bottom walls each having a pair of ends;
  a plurality of mounting brackets, one bracket of said plurality being positioned at each end of the top wall and the bottom wall;
  a first and a second pair of mounting members, each mounting member of the first and second pair having a flexible band with a first fastener positioned at one end of the each band and a second fastener positioned at the opposite end of each band, the first fasteners of the first and second mounting member being secured to one bracket and the second fastener of each mounting member being operable to be removably secured to an interior surface of a vehicle.

14. The barrier system of claim 13, wherein each band of the first mounting members is an elastic band.

15. The barrier system of claim 13, wherein each band of the second mounting members is a fabric band.

16. The barrier system of claim 13 further comprising a clip secured to the bottom wall.

17. The barrier system of claim 13, wherein the back wall comprises a heavy-duty fabric.

18. The barrier system of claim 13, wherein the back wall comprises a holding accessory.

19. The barrier system of claim 13, wherein the body vehicle interior comprises fabrics or materials.

20. The barrier system of claim 13, wherein the bottom wall has a length that is shorter than a length of the top wall.

* * * * *